US012574318B2

(12) United States Patent
Huang et al.

(10) Patent No.: US 12,574,318 B2
(45) Date of Patent: Mar. 10, 2026

(54) RESOURCE DEPLOYMENT AND APPLICATION DATA ROUTING METHODS AND APPARATUSES, AND STORAGE MEDIUM

(71) Applicant: ZTE Corporation, Shenzhen (CN)

(72) Inventors: Guangping Huang, Shenzhen (CN); Bin Tan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 36 days.

(21) Appl. No.: 18/687,003

(22) PCT Filed: Aug. 26, 2022

(86) PCT No.: PCT/CN2022/115199
§ 371 (c)(1),
(2) Date: Feb. 27, 2024

(87) PCT Pub. No.: WO2023/025295
PCT Pub. Date: Mar. 2, 2023

(65) Prior Publication Data
US 2024/0430195 A1      Dec. 26, 2024

(30) Foreign Application Priority Data

Aug. 27, 2021      (CN) .......................... 202110998690.4

(51) Int. Cl.
*H04L 45/74* (2022.01)
*H04L 45/302* (2022.01)
(52) U.S. Cl.
CPC ........... *H04L 45/306* (2013.01); *H04L 45/74* (2013.01)
(58) Field of Classification Search
CPC ............................. H04L 45/306; H04L 45/74
(Continued)

(56) References Cited

U.S. PATENT DOCUMENTS 6,529,950 B1 *   3/2003   Lumelsky ............... H04L 47/20
                                                        709/219
9,967,248 B1 *   5/2018   Cheng ................. H04L 63/0876
(Continued)

FOREIGN PATENT DOCUMENTS

CA            3187697 A1      2/2022
CN         103888485 A      6/2014
(Continued)

OTHER PUBLICATIONS

Yizhou Li, et al., "Dyncast: Use Dynamic Anycast to Facilitate Service Semantics Embedded in IP address," Jun. 2021, IEEE, 2021 IEEE 22nd International Conference on High Performance Switching and Routing (HPSR), https://ieeexplore.ieee.org/stamp/stamp.jsp?tp=&arnumber=9481819&tag=1 (Year: 2021).*
(Continued)

*Primary Examiner* — Ruolei Zong
(74) *Attorney, Agent, or Firm* — CANTOR COLBURN LLP

(57) ABSTRACT

Provided are resource deployment and application data routing methods and apparatuses, and a storage medium. The application data routing method includes: receiving application data sent by an application client, wherein the application data carries or indicates a first cloud resource node list, and the first cloud resource node list comprises one or more cloud resource nodes; determining a target cloud resource node from the first cloud resource node list according to a cloud resource state of each of the one or more cloud resource nodes and a network state between the application client and each of the one or more cloud resource nodes; and routing and forwarding the application data to the target cloud resource node.

11 Claims, 6 Drawing Sheets

(58) Field of Classification Search
USPC .......................................................... 709/238
See application file for complete search history.

(56) References Cited

U.S. PATENT DOCUMENTS

| | | | | |
|---|---|---|---|---|
| 2007/0294405 A1* | 12/2007 | Mohindra | ............... | H04L 67/51 |
| | | | | 709/226 |
| 2012/0072322 A1* | 3/2012 | O'Neil | ................... | G06Q 30/04 |
| | | | | 709/224 |
| 2017/0264677 A1* | 9/2017 | Li | ........................ | H04L 67/1027 |
| 2020/0099742 A1* | 3/2020 | Puente Pestaña | ....... | H04L 67/52 |
| 2021/0014778 A1* | 1/2021 | Xi | ......................... | H04W 48/16 |
| 2021/0055959 A1 | 2/2021 | Rehman | | |
| 2021/0105711 A1 | 4/2021 | Eriksson et al. | | |
| 2022/0086032 A1 | 3/2022 | Park | | |
| 2022/0103476 A1* | 3/2022 | Sun | ....................... | H04L 45/021 |
| 2022/0217087 A1* | 7/2022 | Yang | ....................... | H04L 45/76 |

FOREIGN PATENT DOCUMENTS

| | | | | | |
|---|---|---|---|---|---|
| CN | 112491717 A | * | 3/2021 | ........... | H04L 45/745 |
| CN | 112491739 A | | 3/2021 | | |
| CN | 113181658 A | | 7/2021 | | |
| WO | WO-2020249128 A1 | * | 12/2020 | ............. | H04L 65/40 |
| WO | WO-2020249129 A1 | * | 12/2020 | ............. | H04L 45/02 |
| WO | 2022086262 A1 | | 4/2022 | | |
| WO | WO-2023025387 A1 | * | 3/2023 | ........... | H04L 61/106 |

OTHER PUBLICATIONS

Yizhou Li et al., "Dynamic-Anycast Architecture draft-li-dyncast-architecture-00," Feb. 15, 2021, IETF, https://datatracker.ietf.org/doc/html/draft-li-dyncast-architecture-00 (Year: 2021).*
Yizhou Li et al., "Architecture of Dynamic-Anycast in Compute First Networking (CFN-Dyncast) draft-li-rtgwg-cfn-dyncast-architecture-00," May 4, 2021, IETF, https://www.ietf.org/archive/id/draft-li-rtgwg-cfn-dyncast-architecture-00.txt (Year: 2021).*
Peng Liu et al., "Dynamic-Anycast (Dyncast) Use Cases & Problem Statement draft-liu-dyncast-ps-usecases-01," Feb. 15, 2021, IETF, https://datatracker.ietf.org/doc/html/draft-liu-dyncast-ps-usecases-01 (Year: 2021).*
Machine translation of WO 2020249128 (Year: 2020).*
International Search Report for corresponding application PCT/CN2022/115199 filed Aug. 26, 2022; Mail date Nov. 23, 2022.
European Search Report for corresponding application EP22860641 issued Nov. 25, 2024.
Li Yizhou, "Dyncast Use Dynamic Anycast to Facilitate Service Semantics Embedded in IP Address", 2021 IEEE 22nd International Conference on High Performance Switching and Routing, IEEE, & Jun. 2021, pp. 1-8, XP033942085.
European Search Report for Application No. 23892861.8, dated Dec. 9, 2025, 13 pages.

* cited by examiner

Fig. 1

Input/output device 108

Transmission device 106

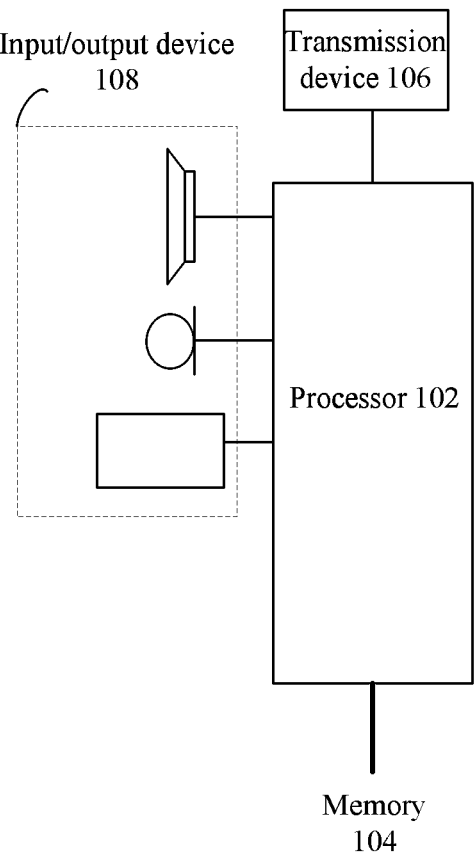

Processor 102

Memory 104

Fig. 2

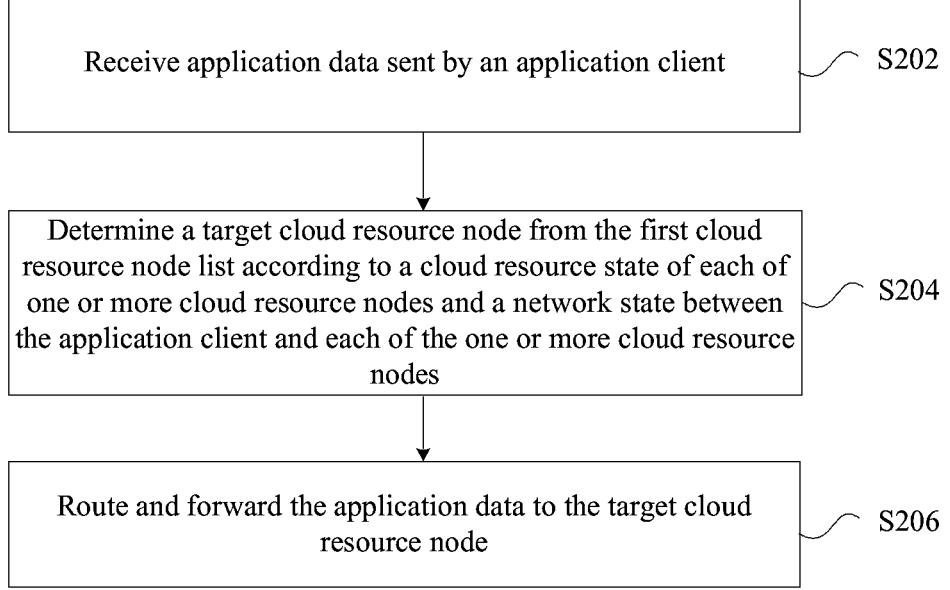

Receive application data sent by an application client — S202

Determine a target cloud resource node from the first cloud resource node list according to a cloud resource state of each of one or more cloud resource nodes and a network state between the application client and each of the one or more cloud resource nodes — S204

Route and forward the application data to the target cloud resource node — S206

Fig. 3

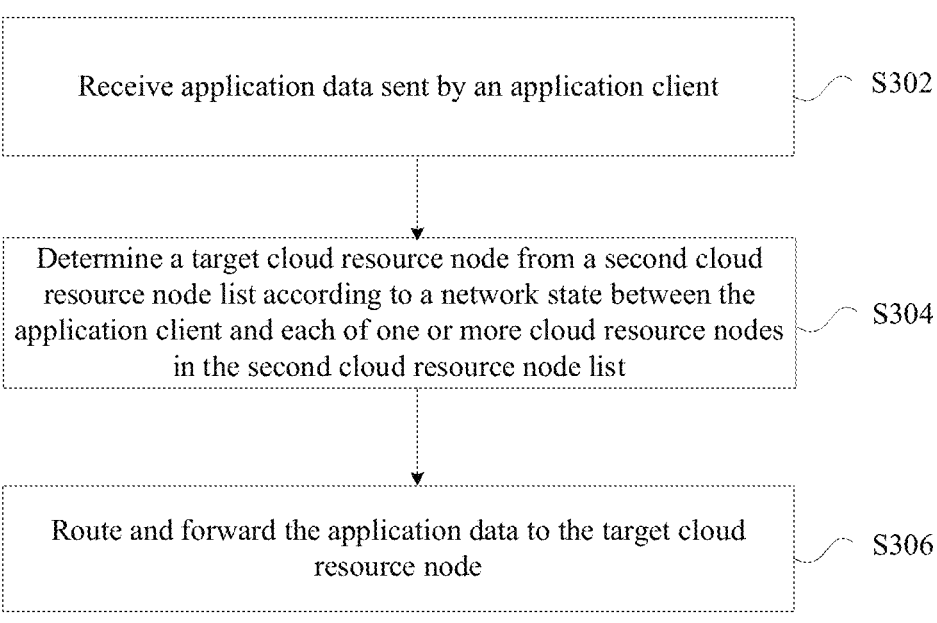

Receive application data sent by an application client — S302

Determine a target cloud resource node from a second cloud resource node list according to a network state between the application client and each of one or more cloud resource nodes in the second cloud resource node list — S304

Route and forward the application data to the target cloud resource node — S306

Fig. 4

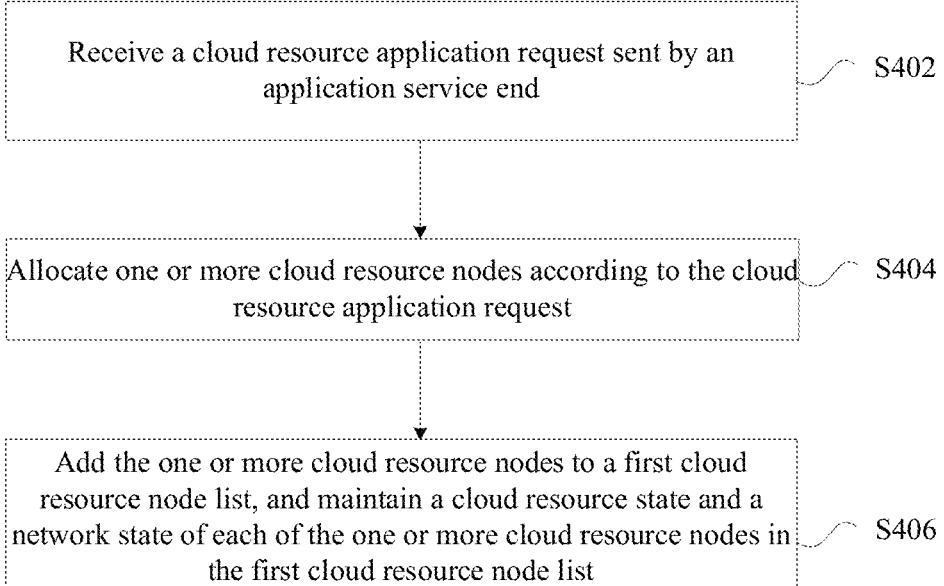

Receive a cloud resource application request sent by an application service end — S402

Allocate one or more cloud resource nodes according to the cloud resource application request — S404

Add the one or more cloud resource nodes to a first cloud resource node list, and maintain a cloud resource state and a network state of each of the one or more cloud resource nodes in the first cloud resource node list — S406

RESOURCE DEPLOYMENT AND APPLICATION DATA ROUTING METHODS AND APPARATUSES, AND STORAGE MEDIUM

CROSS-REFERENCE TO RELATED APPLICATION

The present disclosure is a National Stage Filing of the PCT International Application No. PCT/CN2022/115199 filed on Aug. 26, 2022, which is based upon and claims the benefit of priority from Chinese patent application No. CN 202110998690.4, filed on Aug. 27, 2021, entitled "Resource Deployment and Application Data Routing Method and Apparatuses, and Storage Medium", the disclosure of which is incorporated herein by reference in its entirety.

TECHNICAL FIELD

Embodiments of the present disclosure relate to the field of communications, and in particular, to resource deployment and application data routing methods and apparatuses, and a storage medium.

BACKGROUND

With the exponential growth of data amount of Internet applications, demands of various network applications for computing resources also grow correspondingly, and a traditional centralized cloud computing resource deployment mode starts to evolve and migrate towards a distributed and edge-based computing resource deployment mode, meaning that computing resources and services are becoming more ubiquitous.

The ubiquitous deployment of computing resources, accompanied by massive investment of resources, is not an economically efficient operating mode for specific application providers. On the contrary; the on-demand rental of required computing resources to cloud computing infrastructure providers, such as telecommunications operators or cloud resource lessors, is more suitable for a healthy and efficient application and an industry ecology in which cloud resources and network connectivity resources are integrated and complementary.

However, a challenge of the cooperative mode of decoupling the applications and the underlying cloud network resources is that an application provider can only manage and schedule resources related to the application itself, and cannot obtain refined network connectivity support, which makes it impossible for the application provider to provide high-value and high-quality application services.

SUMMARY

The embodiments of the present disclosure provide resource deployment and application data routing methods and apparatuses, and a storage medium, which at least solve the problem in the related art that an application cannot obtain refined network connectivity support and thus high-value and high-quality application services cannot be provided.

According to an embodiment of the present disclosure, an application data routing method is provided, including: receiving application data sent by an application client, wherein the application data carries or indicates a first cloud resource node list, and the first cloud resource node list includes one or more cloud resource nodes; determining a target cloud resource node from the first cloud resource node list according to a cloud resource state of each of the one or more cloud resource nodes and a network state between the application client and each of the one or more cloud resource nodes; and routing and forwarding the application data to the target cloud resource node.

According to another embodiment of the present disclosure, an application data routing method is provided, including: receiving application data sent by an application client, wherein the application data carries or indicates a second cloud resource node list, the second cloud resource node list includes one or more cloud resource nodes selected from a first cloud resource node list according to a cloud resource state of each cloud resource node in the first cloud resource node list, and the first cloud resource node list includes one or more cloud resource nodes; determining a target cloud resource node from the second cloud resource node list according to a network state between the application client and each of the one or more cloud resource nodes in the second cloud resource node list; and routing and forwarding the application data to the target cloud resource node.

According to another embodiment of the present disclosure, a resource deployment method is provided, including: receiving a cloud resource application request sent by an application service end, wherein the cloud resource application request is used for applying for one or more cloud resource nodes; allocating the one or more cloud resource nodes according to the cloud resource application request: and adding the one or more cloud resource nodes into a first cloud resource node list, and maintaining a cloud resource state and a network state of each of the one or more cloud resource nodes in the first cloud resource node list.

According to another embodiment of the present disclosure, an application data routing apparatus is provided, including: a first reception module, configured to receive application data sent by an application client, wherein the application data carries or indicates a first cloud resource node list, and the first cloud resource node list includes one or more cloud resource nodes; a first determination module, configured to determine a target cloud resource node from the first cloud resource node list according to a cloud resource state of each of the one or more cloud resource nodes and a network state between the application client and each of the one or more cloud resource nodes; and a first routing module, configured to route and forward the application data to the target cloud resource node.

According to another embodiment of the present disclosure, an application data routing apparatus is provided, including: a second reception module, configured to receive application data sent by an application client, wherein the application data carries or indicates a second cloud resource node list, the second cloud resource node list includes one or more cloud resource nodes selected from a first cloud resource node list according to a cloud resource state of each cloud resource node in the first cloud resource node list, and the first cloud resource node list includes one or more cloud resource nodes; a second determination module, configured to determine a target cloud resource node from the second cloud resource node list according to a network state between the application client and each of the one or more cloud resource nodes in the second cloud resource node list; and a second routing module, configured to route and forward the application data to the target cloud resource node.

According to another embodiment of the present disclosure, a resource deployment apparatus is provided, including: a third reception module, configured to receive a cloud resource application request sent by an application service end, wherein the cloud resource application request is used for applying for one or more cloud resource nodes; an allocation module, configured to allocate the one or more cloud resource nodes according to the cloud resource application request; and a maintenance module, configured to add the one or more cloud resource nodes into a first cloud resource node list, and maintaining a cloud resource state and a network state of each of the one or more cloud resource nodes in the first cloud resource node list.

According to another embodiment of the present disclosure, a network edge node is provided, including the aforementioned application data routing apparatus.

According to another embodiment of the present disclosure, a network ingress gateway is provided, including the aforementioned application data routing apparatus.

According to another embodiment of the present disclosure, a converged scheduling platform is provided, including the aforementioned resource deployment apparatus.

According to another embodiment of the present disclosure, a computer-readable storage medium is provided. The computer-readable storage medium stores a computer program, wherein the computer program, when being executed by a processor, causes the processor to execute the operations in any one of the method embodiments.

According to another embodiment of the present disclosure, an electronic device is provided, including a memory and a processor, wherein the memory stores a computer program, and the processor is configured to run the computer program so as to execute the operations in any one of the method embodiments.

In the embodiments of the present disclosure, the network receives application data, which is sent by an application client and carries or indicates a first cloud resource node list including one or more cloud resource nodes, determines a target cloud resource node from the first cloud resource node list according to a cloud resource state of each of the one or more cloud resource nodes and a network state between the application client and each of the one or more cloud resource nodes, and further routes and forwards the application data to the target cloud resource node; or a network receives application data, which is sent by an application client and carries or indicates a second cloud resource node list including one or more cloud resource nodes selected from a first cloud resource node list according to a cloud resource state of each of the one or more cloud resource nodes in the first cloud resource node list, and determines a target cloud resource node from the second cloud resource node list according to a network state between the application client and each of the one or more cloud resource nodes, and further routes and forwards the application data to the target cloud resource node. Compared the solution of specifying a target cloud resource node by an application and executing routing forwarding by a network, the solution provided in the embodiments of the present disclosure implements all or part of the determination of the target cloud resource node on the network, thus, cloud resources can be better scheduled based on the combination of resource states and network states, and more refined network connection support is provided. By virtue of the solution, the problem in the related art that an application cannot obtain refined network connectivity support and thus high-value and high-quality application services cannot be provided can be solved, and computation/network converged scheduling and routing are realized, thereby providing more refined network connection support, and being beneficial for providing high-value and high-quality application services.

BRIEF DESCRIPTION OF THE DRAWINGS

FIG. 1 is a block diagram of hardware structure of a network node for implementing an application data routing method according to an embodiment of the present disclosure;

FIG. 2 is a flowchart of an application data routing method according to an embodiment of the present disclosure;

FIG. 3 is a flowchart of another application data routing method according to an embodiment of the present disclosure;

FIG. 4 is a flowchart of a resource deployment method according to an embodiment of the present disclosure;

DETAILED DESCRIPTION

Figure 5:
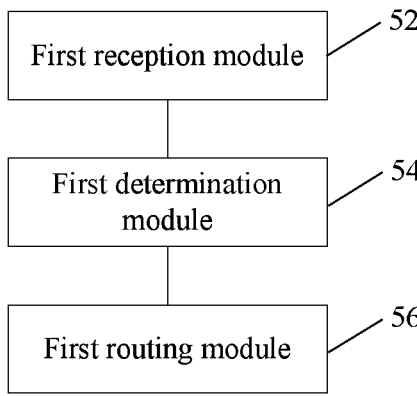
FIG. 5 is a structural block diagram of an application data routing apparatus according to an embodiment of the present disclosure.

In the current mainstream industry model, application services and network connectivity services are provided independently and in parallel. That is, an application provider offers a specific application service to a terminal user, while a network service provider (such as a telecom operator) offers a general network connectivity service unrelated to the application. The network connectivity and the application are not finely coordinated, preventing the joint optimization of the application (such as computing or storage service) and the network connectivity service. Therefore, the current application service based on computing resources can only provide "best effort" application connectivity service to the terminal user.

A current cloud application is a closed system designed for a specific application, which means that the cloud application only manages the basic computing resources related to its own application system. Within this system, the cloud application implements multi-data center resource scheduling but is not compatible with a wider range of third-party resources.

Cloud application providers typically deploy resources in multiple regions based on service development characteristics and requirements, but the granularity of resource deployment is still relatively coarse, and cannot efficiently adapt to and respond to highly dynamic service traffic characteristics.

It can be seen that there are the following technical issues in the current convergence of two computation networks.

The application provider itself cannot invest enough computing resources to achieve fine-grained ubiquitous coverage and needs to rely on third-party cloud computing infrastructure resources for dynamic deployment.

The application provider can only control and schedule resources related to the application itself, and cannot obtain network connection services related to the application.

To this end, the embodiments of the present disclosure provide resource deployment and application data routing methods and apparatuses, and a storage medium. This solution involves the technical architecture and method process of basic computing resource deployment and fine-grained routing. The network receives application data, which is sent by an application client and carries or indicates a first cloud resource node list including one or more cloud resource nodes, determines a target cloud resource node from the first cloud resource node list according to a cloud resource state of each of the one or more cloud resource nodes and a network state between the application client and each of the one or more cloud resource nodes, and further routes and forwards the application data to the target cloud resource node; or a network receives application data, which is sent by an application client and carries or indicates a second cloud resource node list including one or more cloud resource nodes selected from a first cloud resource node list according to a cloud resource state of each of the one or more cloud resource nodes in the first cloud resource node list, and determines a target cloud resource node from the second cloud resource node list according to a network state between the application client and each of the one or more cloud resource nodes, and further routes and forwards the application data to the target cloud resource node. Compared the solution of specifying a target cloud resource node by an application and executing routing forwarding by a network, the solution provided in the embodiments of the present disclosure implements all or part of the determination of the target cloud resource node on the network, thus, cloud resources can be better scheduled based on the combination of resource states and network states, and more refined network connection support is provided. By virtue of the solution, the problem in the related art that an application cannot obtain refined network connectivity support and thus high-value and high-quality application services cannot be provided can be solved, and computation/network converged scheduling and routing are realized, thereby providing more refined network connection support, and being beneficial for providing high-value and high-quality application services. The embodiments of the present disclosure will be described below in detail with reference to the accompanying drawings and in conjunction with the embodiments.

It should be noted that, terms such as "first" and "second" in the description, claims, and accompanying drawings of the present disclosure are used to distinguish similar objects, but are not necessarily used to describe a specific sequence or order.

The application data routing method embodiment provided in the embodiments of the present application may be executed in a network edge node, a network ingress gateway, or a similar network node, and the resource deployment method embodiment provided in the embodiments of the present application may be executed in a converged scheduling platform or a similar network management platform. Taking the operation on a network node as an example, FIG. 1 is a block diagram of hardware structure of a network node for implementing an application data routing method according to an embodiment of the present disclosure. As shown in FIG. 1, the network node may include one or more (only one is shown in FIG. 1) processors 102 (each processor 102 may include, but are not limited to, a processing device such as a microprocessor (e.g., Micro-Controller Unit (MCU)) or a programmable logic device (Field Programmable Gate Array (FPGA)) and a memory 104 for storing data. The network node may further include a transmission device 106 for a communication function and an input/output device 108. A person having ordinary skill in the art may understand that the structure shown in FIG. 1 is merely exemplary, which does not limit the structure of the foregoing network node. For example, the network node may also include more or fewer modules than shown in FIG. 1, or have a different configuration than shown in FIG. 1.

The memory 104 may be configured to store a computer program, for example, a software program and a module of application software, such as a computer program corresponding to the resource deployment and application data routing methods in the embodiments of the present disclosure. The one or more processors 102 run the computer program stored in the memory 104, so as to execute various function applications and data processing, that is, to implement the resource deployment and application data routing methods. The memory 104 may include high-speed random access memory, and may also include non-volatile memory, such as one or more magnetic storage devices, one or more flash memories, or one or more other non-volatile solid-state memories. In some examples, the memory 104 may further include a memory remotely located with respect to the one or more processors 102, which may be connected to network nodes over networks. Examples of such networks include, but are not limited to, the Internet, intranets, local area networks, mobile communication networks, and combinations thereof.

The transmission device 106 is configured to receive or transmit data via a network. Specific examples of the described network may include a wireless network provided by a communication provider of a network node. In an example, the transmission device 106 may include a Network Interface Controller (NIC) that may be coupled to other network devices via a base station to communicate with the Internet. In an example, the transmission device 106 may be a Radio Frequency (RF) module for communicating wirelessly with the Internet.

The present embodiment provides an application data routing method running on a network edge node, a network ingress gateway or a similar network node. FIG. 2 is a flowchart of an application data routing method according to an embodiment of the present disclosure. As shown in FIG. 2, the flow includes the following operations S202 to S206.

In operation S202, application data sent by an application client is received, wherein the application data carries or indicates a first cloud resource node list, and the first cloud resource node list includes one or more cloud resource nodes.

In the embodiments of the present disclosure, cloud resources encompass all resources provided over the network, including but not limited to computing, storage, application software, and services, etc. Given that a typical use case of this solution is for application providers to lease cloud resources, the currently involved leased cloud resources mainly include basic computing cloud resources, such as hardware computing resources.

In the embodiments of the present disclosure, the first cloud resource node list may be indicated in the application data in one of the following manners:

an index of the first cloud resource node list is carried in the application data;

an anycast address associated with the first cloud resource node list is used as a destination address corresponding to the application data;

an anycast address carrying a bitmap is used as a destination address corresponding to the application data, wherein an indication bit in the bitmap is used for indicating whether a cloud resource node corresponding to the indication bit is contained the first cloud resource node list; or an identification index associated with the first cloud resource node list is carried in a field other than a destination address field in the application data, wherein the field other than the destination address field includes a dedicated forwarding packet header and/or an IPV6 known extension packet header.

A packet header of a data packet of application data may be extended to carry an index to indicate the first cloud resource node list. A current anycast address means may be used without modification or extension to indicate the first cloud resource node list through an anycast address.

In operation S204, a target cloud resource node is determined from the first cloud resource node list according to a cloud resource state of each of the one or more cloud resource nodes and a network state between the application client and each of the one or more cloud resource nodes.

In the embodiments of the present disclosure, the cloud resource state of each of the one or more cloud resource nodes includes at least one of: a cloud resource occupancy state of each of the one or more cloud resource nodes; and an application capacity load state of each of the one or more cloud resource nodes. The cloud resource state reflects the usage situation of the cloud resource on the cloud resource node, for example, whether the cloud resource is busy or idle, application traffic on the cloud resource, etc. The network may select a relatively idle cloud resource node as the target cloud resource node according to the information.

In the embodiments of the present disclosure, the network state between the application client and each of the one or more cloud resource nodes includes at least one of: a bandwidth, a delay, a jitter, and a packet loss rate. According to the network state and a requirement of an application on network connection performance, the network may select a cloud resource node with better network connection performance as the target cloud resource node.

In the embodiments of the present disclosure, the cloud resource state of each of the one or more cloud resource nodes in the first cloud resource node list and the network state between the application client and each of the one or more cloud resource nodes in the first cloud resource node list are maintained in a network edge node, a network ingress gateway or a converged scheduling platform. The current application data routing method may be implemented on a network edge node or a network ingress gateway. After the application data sent by the application client is received, in a case where the network edge node or the network ingress gateway locally maintains the cloud resource state of each of the one or more cloud resource nodes in the first cloud resource node list and the network state between the application client and each of the one or more cloud resource nodes in the first cloud resource node list, the operation of determining the target cloud resource node from the first cloud resource node list in operation S204 may be directly performed by the network edge node or the network ingress gateway; and in a case where the cloud resource state of each of the one or more cloud resource nodes in the first cloud resource node list and the network state between the application client and each of the one or more cloud resource nodes in the first cloud resource node list are maintained in the converged scheduling platform, in response to receiving the application data sent by the application client, after acquiring the cloud resource state of each of the one or more cloud resource nodes and the network state between the application client and each of the one or more cloud resource nodes from the converged scheduling platform, operation S204 of determining the target cloud resource node from the first cloud resource node list is performed by the network edge node or the network ingress gateway.

In the embodiments of the present disclosure, the network may determine the target cloud resource node comprehensively according to the resource state and the network state, so that the performance and response speed of cloud computing and the quality of data transmission are the highest, and the delay is the smallest. Therefore, operation S204 may be implemented in the following manner: joint optimization of a cloud resource Service Level Agreement (SLA) and a network SLA is performed on the one or more cloud resource nodes in the first cloud resource node list according to the cloud resource state of each of the one or more cloud resource nodes and the network state between the application client and each of the one or more cloud resource nodes; and the target cloud resource node is determined from the first cloud resource node list based on a result of joint optimization of the cloud resource SLA and the network SLA.

The joint optimization of the cloud resource SLA and the network SLA aims to determine an optimal target cloud resource node comprehensively according to the resource state and the network state. The operation that joint optimization of a cloud resource SLA and a network SLA is performed on the one or more cloud resource nodes in the first cloud resource node list according to the cloud resource state of each of the one or more cloud resource nodes and the network state between the application client and each of the one or more cloud resource nodes may include: network connection path computation is executed, according to the cloud resource state of each of the one or more cloud resource nodes and the network state between the application client and each of the one or more cloud resource nodes, on the one or more cloud resource nodes in the first cloud resource node list by using a cloud resource state and an application network demand as constraint. It should be noted that, according to different actual application scenarios, different joint optimization policies based on different cloud resource SLAs and network SLAs may be set, the cloud resource SLA based on the resource state and the network SLA based on the network state may be executed jointly (namely, the two are both used as constraint conditions), or may also be executed in a progressive manner (namely, firstly executing one of the determination schemes, and then executing the other of the determination schemes within the range of the determination result), which is not limited in the embodiments of the present disclosure.

In operation S206, the application data is routed and forwarded to the target cloud resource node.

The entity for performing the foregoing operations may be, but is not limited to, a network edge node, a network ingress gateway, or a similar network node.

In the embodiments of the present disclosure, the network receives application data, which is sent by an application client and carries or indicates a first cloud resource node list including one or more cloud resource nodes, determines a target cloud resource node from the first cloud resource node list according to a cloud resource state of each of the one or more cloud resource nodes and a network state between the application client and each of the one or more cloud resource nodes, and further routes and forwards the application data to the target cloud resource node. Compared the solution of specifying a target cloud resource node by an application and executing routing forwarding by a network, the solution provided in the embodiments of the present disclosure implements the determination of the target cloud resource node on the network, thus, cloud resources can be better scheduled based on the combination of resource states and network states, and more refined network connection support is provided. By virtue of the solution, the problem in the related art that an application cannot obtain refined network connectivity support and thus high-value and high-quality application services cannot be provided can be solved, and computation/network converged scheduling and routing are realized, thereby providing more refined network connection support, and being beneficial for providing high-value and high-quality application services.

Through the description of the foregoing embodiments, a person having ordinary skill in the art may clearly understand that the method according to the foregoing embodiments may be implemented by software in addition to a necessary universal hardware platform, and definitely may also be implemented by hardware. However, in many cases, the former is a preferred implementation. Based on such understanding, the essence of the technical solutions of the embodiments of the present disclosure or the part contributing to the related art may be embodied in the form of a software product. The computer software product may be stored in a storage medium (such as a ROM/RAM, a magnetic disk, and an optical disk), and includes several instructions for instructing a terminal device (which may be a mobile phone, a computer, a server, a network device, or the like) to implement the method of the embodiments of the present disclosure.

The embodiments provide another application data routing method running on a network edge node, a network ingress gateway or a similar network node. FIG. 3 is a flowchart of another application data routing method according to an embodiment of the present disclosure. As shown in FIG. 3, the flow includes the following operations S302 to S306.

In operation S302, application data sent by an application client is received, wherein the application data carries or indicates a second cloud resource node list, the second cloud resource node list includes one or more cloud resource nodes selected from a first cloud resource node list according to a cloud resource state of each cloud resource node in the first cloud resource node list, and the first cloud resource node list includes one or more cloud resource nodes.

In the embodiments of the present disclosure, cloud resources encompass all resources provided over the network, including but not limited to computing, storage, application software, and services, etc. Given that a typical use case of this solution is for application providers to lease cloud resources, the currently involved leased cloud resources mainly include basic computing cloud resources, such as hardware computing resources.

In the embodiments of the present disclosure, the second cloud resource node list may be indicated in the application data in one of the following manners:

an index of the second cloud resource node list is carried in the application data;

an anycast address associated with the second cloud resource node list is used as a destination address corresponding to the application data; or an anycast address carrying a bitmap is used as a destination address corresponding to the application data, wherein an indication bit in the bitmap is used for indicating whether a cloud resource node, corresponding to the indication bit, in the first cloud resource node list is contained the second cloud resource node list.

A packet header of a data packet of application data may be extended to carry an index to indicate the second cloud resource node list. A current anycast address means may be used without modification or extension to indicate the second cloud resource node list through an anycast address.

In the present embodiment, an application side performs preliminary screening of cloud resource nodes based on a cloud resource state. The one or more cloud resource nodes in the second cloud resource node list may be selected in the following manner: optimization of a cloud resource Service Level Agreement (SLA) is performed on the one or more cloud resource nodes in the first cloud resource node list according to the cloud resource state of each of the one or more cloud resource nodes in the first cloud resource node list, and one or more cloud resource nodes are selected from the first cloud resource node list based on a result of optimization of the cloud resource SLA to form the second cloud resource node list.

As an exemplary implementation, the operation that optimization of the cloud resource SLA is performed on the one or more cloud resource nodes in the first cloud resource node list according to the cloud resource state of each of the one or more cloud resource nodes in the first cloud resource node list may include: screening is performed on the one or more cloud resource nodes in the first cloud resource node list by using a cloud resource state as a constraint.

In the embodiments of the present disclosure, the cloud resource state of each of the one or more cloud resource nodes includes at least one of: a cloud resource occupancy state of each of the one or more cloud resource nodes; and an application capacity load state of each of the one or more cloud resource nodes. The cloud resource state reflects the usage situation of the cloud resource on the cloud resource node, for example, whether the cloud resource is busy or idle, application traffic on the cloud resource, etc. The network may select one or more relatively idle cloud resource nodes according to the information to form the second cloud resource node list.

In the embodiments of the present disclosure, the cloud resource state of each of the one or more cloud resource nodes in the first cloud resource node list is maintained in a converged scheduling platform and synchronized to the application client or an application server. By means of the method, an application side can acquire a real-time state of the cloud resources, so that it is convenient for the application side to realize preliminary screening of cloud resource nodes based on the cloud resource state, and to send screened cloud resource nodes to a network side via the second cloud resource node list.

In operation S304, a target cloud resource node is determined from the second cloud resource node list according to a network state between the application client and each of the one or more cloud resource nodes in the second cloud resource node list.

In the embodiments of the present disclosure, the network state between the application client and each of the one or more cloud resource nodes includes at least one of: a bandwidth, a delay, a jitter, and a packet loss rate. According to the network state and a requirement of an application on network connection performance, the network may select a cloud resource node with better network connection performance as the target cloud resource node.

In the embodiments of the present disclosure, the network state between the application client and each of the one or more cloud resource nodes in the second cloud resource node list is maintained in a network edge node, a network ingress gateway or a converged scheduling platform. The current application data routing method may be implemented on a network edge node or a network ingress gateway. After the application data sent by the application client is received, in a case where the network edge node or the network ingress gateway locally maintains the network state between the application client and each of the one or more cloud resource nodes in the second cloud resource node list, the operation of determining the target cloud resource node from the second cloud resource node list in operation S304 may be directly performed by the network edge node or the network ingress gateway; and in a case where the network state between the application client and each of the one or more cloud resource nodes in the second cloud resource node list is maintained in the converged scheduling platform, in response to receiving the application data sent by the application client, after acquiring the network state between the application client and each of the one or more cloud resource nodes in the second cloud resource node list from the converged scheduling platform, the operation of determining the target cloud resource node from the second cloud resource node list in operation S304 is performed by the network edge node or the network ingress gateway.

In the embodiments of the present disclosure, the network may determine the target cloud resource node based on the network state, so that the quality of data transmission is the highest and the delay is the smallest. Therefore, operation S304 may be implemented in the following manner: optimization of a network SLA is performed on the one or more cloud resource nodes in the second cloud resource node list according to the network state between the application client and each of the one or more cloud resource nodes in the second cloud resource node list; and the target cloud resource node is determined from the second cloud resource node list based on a result of optimization of the network SLA.

The joint optimization of the cloud resource SLA and the network SLA aims to determine an optimal target cloud resource node comprehensively according to the resource state and the network state. The operation that optimization of a network SLA is performed on the one or more cloud resource nodes in the second cloud resource node list according to the network state between the application client and each of the one or more cloud resource nodes in the second cloud resource node list is implemented in one of the following manners. In a case where the second cloud resource node list includes one cloud resource node, network connection path computation is executed, according to the network state between the application client and the cloud resource node in the second cloud resource node list, on the cloud resource node in the second cloud resource node list by using an application network demand as a constraint. In a case where the second cloud resource node list includes multiple cloud resource nodes, network connection path computation is executed, according to the network state between the application client and each of the multiple cloud resource nodes in the second cloud resource node list, on the multiple cloud resource nodes in the second cloud resource node list by using a full-network service dynamic traffic load and an application network demand as a constraint.

In operation S306, the application data is routed and forwarded to the target cloud resource node.

In the embodiments of the present disclosure, a network receives application data, which is sent by an application client and carries or indicates a second cloud resource node list including one or more cloud resource nodes selected from a first cloud resource node list according to a cloud resource state of each of the one or more cloud resource nodes in the first cloud resource node list, and determines a target cloud resource node from the second cloud resource node list according to a network state between the application client and each of the one or more cloud resource nodes, and further routes and forwards the application data to the target cloud resource node. Compared the solution of specifying a target cloud resource node by an application and executing routing forwarding by a network, the solution provided in the embodiments of the present disclosure implements the determination of the target cloud resource node on the network, thus, cloud resources can be better scheduled based on the combination of resource states and network states, and more refined network connection support is provided. By virtue of the solution, the problem in the related art that an application cannot obtain refined network connectivity support and thus high-value and high-quality application services cannot be provided can be solved, and computation/network converged scheduling and routing are realized, thereby providing more refined network connection support, and being beneficial for providing high-value and high-quality application services.

Through the description of the foregoing embodiments, a person having ordinary skill in the art may clearly understand that the method according to the foregoing embodiments may be implemented by software in addition to a necessary universal hardware platform, and definitely may also be implemented by hardware. However, in many cases, the former is a preferred implementation. Based on such understanding, the essence of the technical solutions of the embodiments of the present disclosure or the part contributing to the related art may be embodied in the form of a software product. The computer software product may be stored in a storage medium (such as a ROM/RAM, a magnetic disk, and an optical disk), and includes several instructions for instructing a terminal device (which may be a mobile phone, a computer, a server, a network device, or the like) to implement the method of the embodiments of the present disclosure.

In the two application data routing methods of the foregoing embodiments, the network needs to maintain cloud resource node lists deployed for different cloud resources, and further maintain a state of each cloud resource node for determining the target cloud resource node. Given that there are many lessees of cloud resource nodes, the application provider may also change the leased cloud resource nodes at any time. This requires the network to accept the application provider's requests for cloud resource nodes and maintain the cloud resource node lists accordingly. To this end, a resource deployment method running on a converged scheduling platform or a similar network management platform is provided in the present embodiment. FIG. 4 is a flowchart of a resource deployment method according to an embodiment of the present disclosure. As shown in FIG. 4, the flow includes the following operations S402 to S406.

In operation S402, a cloud resource application request sent by an application service end is received, wherein the cloud resource application request is used for applying for one or more cloud resource nodes.

In operation S404, the one or more cloud resource nodes are allocated according to the cloud resource application request.

In operation S406, the one or more cloud resource nodes are added into a first cloud resource node list, and a cloud resource state and a network state of each of the one or more cloud resource nodes in the first cloud resource node list are maintained.

Of course, the network may also accept the deletion of the cloud resource nodes, then the flow may further include the following operations:

a cloud resource deletion request sent by the application service end is received, wherein the cloud resource application request is used for deleting at least one cloud resource node; and the at least one cloud resource node is deleted from the first cloud resource node list according to the cloud resource deletion request, and the cloud resource state and the network state of the deleted cloud resource node are no longer maintained.

Through the description of the foregoing embodiments, a person having ordinary skill in the art may clearly understand that the method according to the foregoing embodiments may be implemented by software in addition to a necessary universal hardware platform, and definitely may also be implemented by hardware. However, in many cases, the former is a preferred implementation. Based on such understanding, the essence of the technical solutions of the embodiments of the present disclosure or the part contributing to the related art may be embodied in the form of a software product. The computer software product may be stored in a storage medium (such as a ROM/RAM, a magnetic disk, and an optical disk), and includes several instructions for instructing a terminal device (which may be a mobile phone, a computer, a server, a network device, or the like) to implement the method of the embodiments of the present disclosure.

The embodiments further provide an application data routing apparatus, which is configured to implement the described embodiments and exemplary implementations, and what has been described will not be elaborated. The term "module", as used hereinafter, is a combination of software and/or hardware capable of realizing a predetermined function. Although the apparatus described in the following embodiments is preferably implemented by software, implementation of hardware or a combination of software and hardware is also possible and conceived.

FIG. 5 is a structural block diagram of an application data routing apparatus according to an embodiment of the present disclosure. As shown in FIG. 5, the apparatus includes:

a first reception module 52, configured to receive application data sent by an application client, wherein the application data carries or indicates a first cloud resource node list, and the first cloud resource node list includes one or more cloud resource nodes;

a first determination module 54, configured to determine a target cloud resource node from the first cloud resource node list according to a cloud resource state of each of the one or more cloud resource nodes and a network state between the application client and each of the one or more cloud resource nodes; and a first routing module 56, configured to route and forward the application data to the target cloud resource node.

The embodiments further provide a network edge node, which includes the above application data routing apparatus.

The embodiments further provide a network ingress gateway, which includes the foregoing application data routing apparatus.

It should be noted that each module may be implemented by software or hardware. The latter may be implemented in the following manner, but is not limited thereto. All the modules are located in a same processor; alternatively, the modules are located in different processors in an arbitrary combination.

For specific examples in the present embodiment, reference may be made to the examples described in the foregoing embodiments and exemplary embodiments, and details are not repeatedly described in the present embodiment.

The embodiments further provide another application data routing apparatus, which is configured to implement the foregoing embodiments and exemplary implementations, and what has been described will not be elaborated. The term "module", as used hereinafter, is a combination of software and/or hardware capable of realizing a predetermined function. Although the apparatus described in the following embodiments is preferably implemented by software, implementation of hardware or a combination of software and hardware is also possible and conceived.

Figure 6:
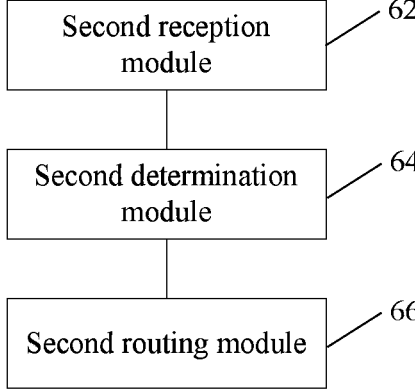
FIG. 6 is a structural block diagram of another application data routing apparatus according to an embodiment of the present disclosure.

FIG. 6 is a structural block diagram of another application data routing apparatus according to an embodiment of the present disclosure. As shown in FIG. 6, the apparatus includes:

a second reception module 62, configured to receive application data sent by an application client, wherein the application data carries or indicates a second cloud resource node list, the second cloud resource node list includes one or more cloud resource nodes selected from a first cloud resource node list according to a cloud resource state of each cloud resource node in the first cloud resource node list, and the first cloud resource node list includes one or more cloud resource nodes;

a second determination module 64, configured to determine a target cloud resource node from the second cloud resource node list according to a network state between the application client and each of the one or more cloud resource nodes in the second cloud resource node list; and a second routing module 66, configured to route and forward the application data to the target cloud resource node.

The embodiments further provide a network edge node, which includes the above application data routing apparatus.

The embodiments further provide a network ingress gateway, which includes the foregoing application data routing apparatus.

It should be noted that each module may be implemented by software or hardware. The latter may be implemented in the following manner, but is not limited thereto. All the modules are located in a same processor; alternatively, the modules are located in different processors in an arbitrary combination.

For specific examples in the present embodiment, reference may be made to the examples described in the foregoing embodiments and exemplary embodiments, and details are not repeatedly described in the present embodiment.

The embodiments further provide a resource deployment apparatus, which is configured to implement the described embodiments and exemplary implementations, and what has been described will not be elaborated. The term "module", as used hereinafter, is a combination of software and/or hardware capable of realizing a predetermined function. Although the apparatus described in the following embodiments is preferably implemented by software, implementation of hardware or a combination of software and hardware is also possible and conceived.

Figure 7:
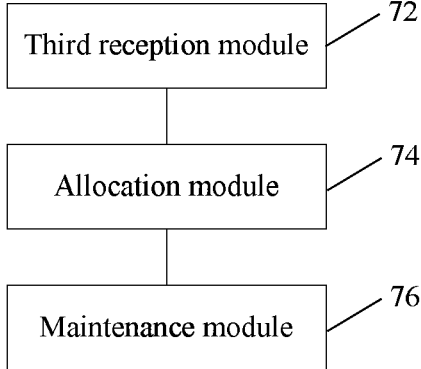
FIG. 7 is a structural block diagram of a resource deployment apparatus according to an embodiment of the present disclosure.

FIG. 7 is a structural block diagram of a resource deployment apparatus according to an embodiment of the present disclosure. As shown in FIG. 7, the apparatus includes:

a third reception module 72, configured to receive a cloud resource application request sent by an application service end, wherein the cloud resource application request is used for applying for one or more cloud resource nodes;

an allocation module 74, configured to allocate the one or more cloud resource nodes according to the cloud resource application request; and a maintenance module 76, configured to add the one or more cloud resource nodes into a first cloud resource node list, and maintaining a cloud resource state and a network state of each of the one or more cloud resource nodes in the first cloud resource node list.

The embodiments further provide a converged scheduling platform, which includes the above resource deployment apparatus.

It should be noted that each module may be implemented by software or hardware. The latter may be implemented in the following manner, but is not limited thereto. All the modules are located in a same processor; alternatively, the modules are located in different processors in an arbitrary combination.

For specific examples in the present embodiment, reference may be made to the examples described in the foregoing embodiments and exemplary embodiments, and details are not repeatedly described in the present embodiment.

The embodiments of the present disclosure also provide a computer-readable storage medium. The computer-readable storage medium stores a computer program, wherein the computer program, when being executed by a processor, causes the processor to execute the operations in any one of the described method embodiments.

In an exemplary embodiment, the computer-readable storage medium may include, but is not limited to, any medium that can store a computer program, such as a Universal Serial Bus (USB) flash drive, a Read-Only Memory (ROM), a Random Access Memory (RAM), a removable hard disk, a magnetic disk, or an optical disc.

The embodiments of the present disclosure further provide an electronic device, including a memory and a processor. The memory stores a computer program. The processor is configured to run the computer program to execute operations in any one of the method embodiments.

In an exemplary embodiment, the electronic device may further include a transmission device and an input/output device, wherein the transmission device is connected to the processor, and the input/output device is connected to the processor.

For specific examples in the present embodiment, reference may be made to the examples described in the foregoing embodiments and exemplary embodiments, and details are not repeatedly described in the present embodiment.

The above application data routing method and the resource deployment method according to the embodiments of the present disclosure will be described in detail below. It should be noted that the following exemplary embodiments are merely intended to facilitate comprehension of the solutions, and shall not be construed as limitations to the present disclosure. The following exemplary embodiments provide a technical architecture and method process for basic computing resource deployment and refined routing, and design a computation/network converged scheduling and routing mechanism based on basic computing resources. In this mechanism, the application operation and deployment is decoupled from basic computing resources and network resources. In certain exemplary implementations, an anycast address and an improved anycast address structure that identifies basic computing resource nodes associated with the application are also introduced.

For clarity of description of exemplary embodiments, the definitions and illustrations of concepts and roles are first provided as follows.

(1) Application providers include developers, operators, and service distributers of applications for end users, including industry and individual users.

(2) Network service providers include operators and distributers of basic network connection services, such as telecommunication operators.

(3) Infrastructure cloud resource (e.g., cloud resource such as computing and storage resource, hereinafter referred to as basic cloud resource for short) providers include operators and distributers of basic computing and storage resources for application providers.

(4) Computation-network converged scheduling platform operators include service providers that integrate cloud resources, such as basic network, computing resources, and storage resources, and perform integrated operation and distribution.

(2)-(4) may be independent operators and distributers, or any combination of operators and distributers.

The basic architecture of the current exemplary embodiment still complies with the networking architecture principle of decoupling the application and the network, that is, the interaction logic, the deployment and the operation of the application run independently, and the network does not perceive and participate in the interaction logic, the deployment and the operation of the application. However, under a unified management architecture for basic computing resources, the network can implement refined coordination of the network and the basic computing resources, so as to provide a more high quality and efficient network connection service for the applications, thereby enabling more diverse and more agile and flexible service capabilities and service modes.

In some exemplary implementations, an application applies, according to dynamic requirements of a service, to a converged scheduling platform operator for computing resources, and completes corresponding application deployment. An application client initiates an application request to a computation/network converged scheduling platform operator. The solution may be implemented in the following two modes 1 and 2, which are respectively described in detail below:

Mode 1

A network acquires an application available node list (containing basic computing resource nodes) from a request sent by an application client, executes a computation/network joint optimization strategy, acquires an optimal application service node, and completes routing and forwarding of service traffic to the optimal application service node.

Figure 8:
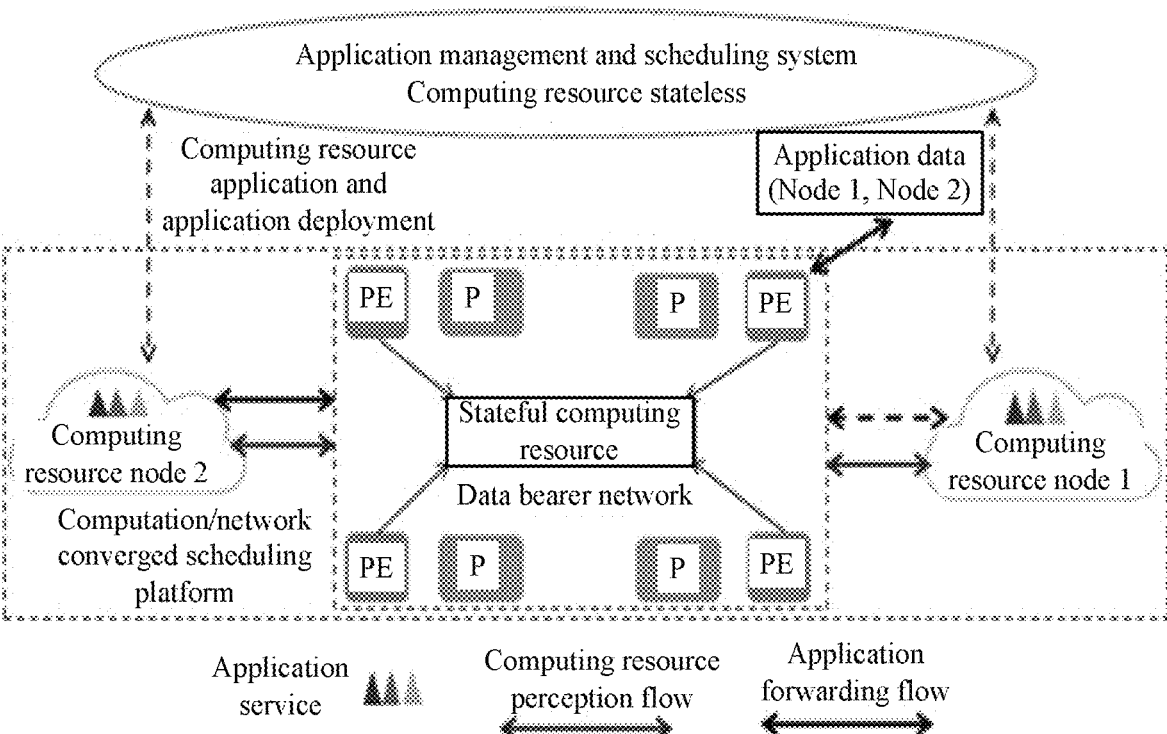
FIG. 8 is a schematic diagram of a computation/network scheduling architecture and process based on stateful computing resources according to mode 1 of the exemplary embodiments of the present disclosure.

In this mode, the network needs to maintain a computing resource state routing table of the basic computing resource nodes, and perform joint superposition optimization based on the computing resource state routing table and a network state routing table, that is, the selected node and a network path to the selected node should simultaneously satisfy requirements of a computing SLA and a network SLA of the application. FIG. 8 is a schematic diagram of a computation/network scheduling architecture and process based on stateful computing resources according to mode 1 of the exemplary embodiments of the present disclosure. As shown in FIG. 8, application data carrying an available deployment node list initiates an application connection request to a computation/network converged scheduling platform, the network executes computation/network dual-target optimization according to the computation and network state routing table to obtain an optimal network path to an optimal node 2, and completes routing and forwarding of the application data.

In some exemplary implementations, the network only maintains the resource states of the computing nodes at the network edge node (e.g., Provider Edge (PE)), and intermediate nodes (e.g., P nodes) do not sense or maintain the resource states of the computing nodes.

Further, the parameter items of the computing resource state routing table may be divided into multiple hierarchical granularities according to application requirements and operation requirements, such as basic computing resource occupation and idle states of the computing resource nodes, and application capacity load states of the computing resource nodes.

Mode 2

A network acquires application nodes (basic computing resource nodes) or a node list which are/is preferentially selected by an application provider from a request sent by an application client. The network selects an optimal network path to the selected nodes, and completes routing and forwarding of service traffic to the node.

In this mode, the application itself maintains and controls the states of the basic computing resource nodes, and completes optimization in the computing resource SLA dimensions.

When the optimization result is a single application service node, the network uses the application node as a destination, and executes network connection path computation by using an application network demand as a constraint, the application network demand including application demands in the dimensions such as bandwidth, time delay, jitter and packet loss.

When the optimization result is an application service node list, the network executes network connection path computation by using dynamic traffic load of services of the entire network and the application network demand as a constraint, the application network demand including application demands in the dimensions such as bandwidth, time delay, jitter and packet loss.

Figure 9:
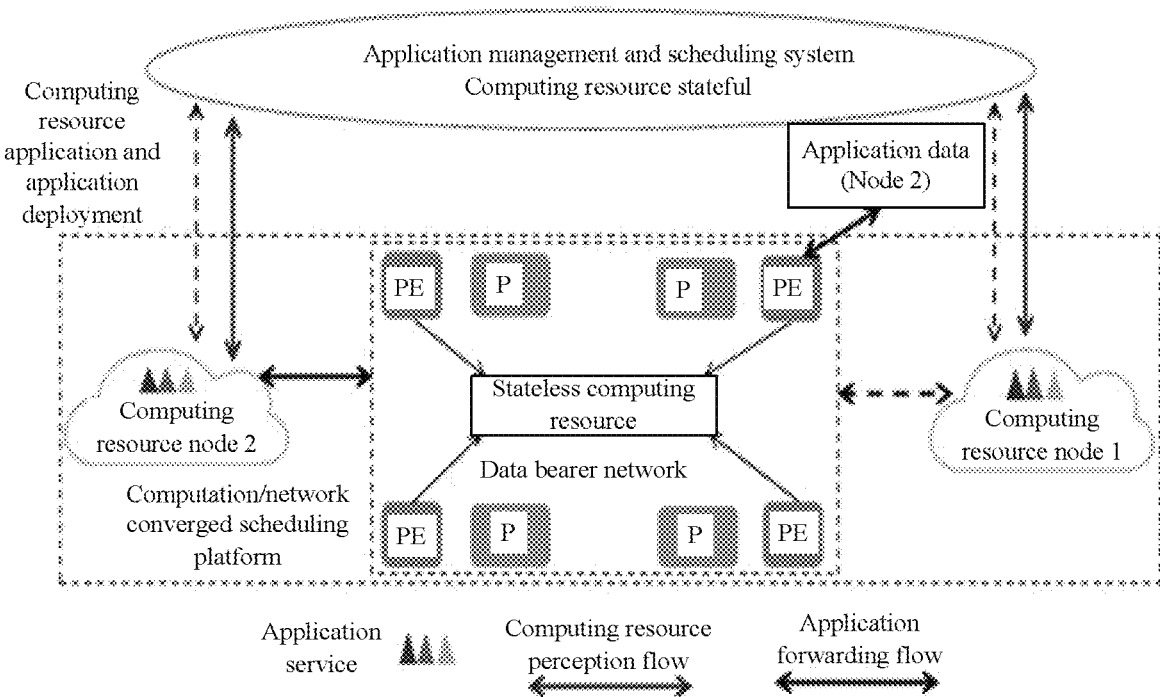
FIG. 9 is a schematic diagram of a computation/network scheduling architecture and process based on stateless computing resources according to mode 2 of the exemplary embodiments of the present disclosure.

FIG. 9 is a schematic diagram of a computation/network scheduling architecture and process based on stateless computing resources according to mode 2 of the exemplary embodiments of the present disclosure. As shown in FIG. 9, the application management and scheduling system maintains computing resource states at node 1 and node 2, and selects an optimal computing node according to the state table, for example, the optimal computing node is computing node 2 (which may also be an optimal node list). The network edge node (e.g., Provider Edge (PE)) performs optimal network path computation to the selected optimal computing node and forwards the application data to the specified optimal computing node.

The data bearer network in the computation/network converged scheduling system does not sense or maintain the dynamic resource states of the computing nodes in the mode, but still maintains the network topology states of the computing nodes.

First Exemplary Implementation

Figure 10:
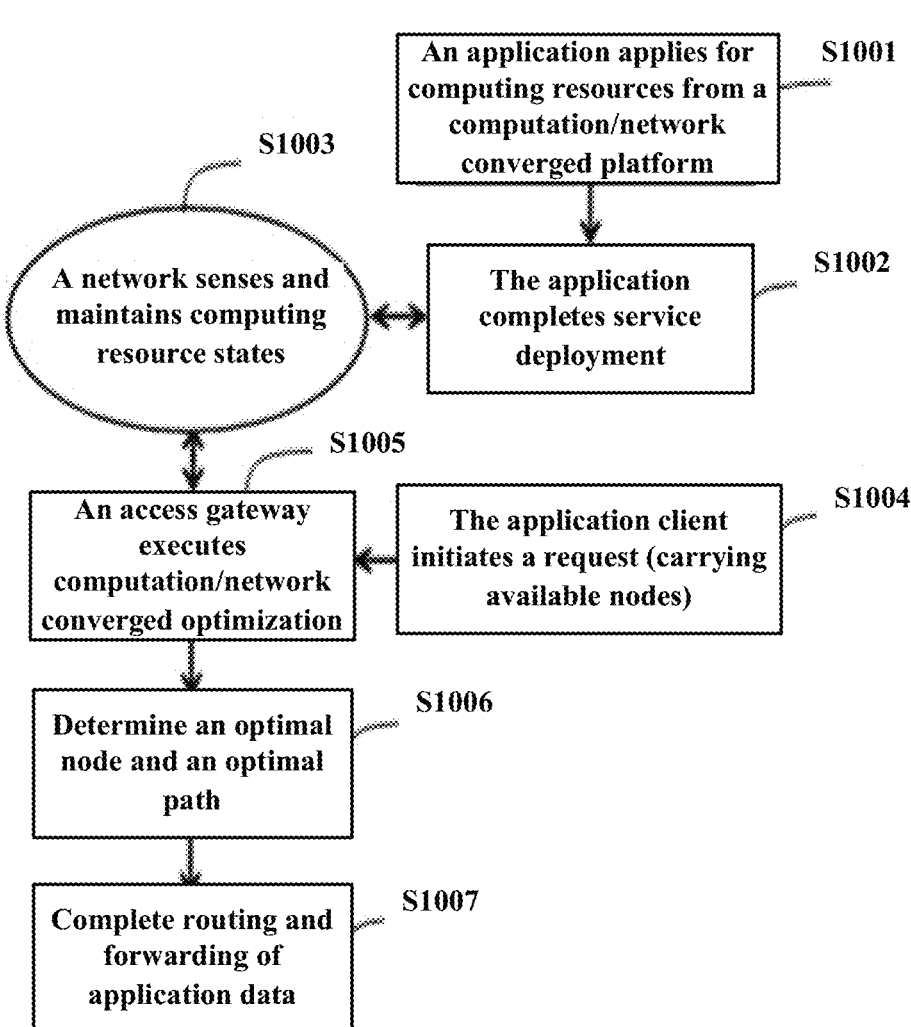
FIG. 10 is a flowchart of computation/network converged scheduling and routing based on stateful computing resources in an Anycast-based network according to a first exemplary implementation of the present disclosure.

The embodiments provide a computation/network converged scheduling and routing process based on stateful computing resources in an Anycast-based network. FIG. 10 is a flowchart of computation/network converged scheduling and routing based on stateful computing resources in an Anycast-based network according to a first exemplary implementation of the present disclosure. As shown in FIG. 10, an anycast address is adopted herein to associate and identify a computing resource node group deployed by an application, that is, when the application applies for computing resources and deploys the application on the computing resource nodes, the host address list to which these computing resource nodes belong is associated with a specific anycast address, and when an application client initiates a connection request, the anycast address is used as a destination address, and the network performs computation/network converged selection among the group of computing resource nodes associated with the anycast address.

Figure 11:
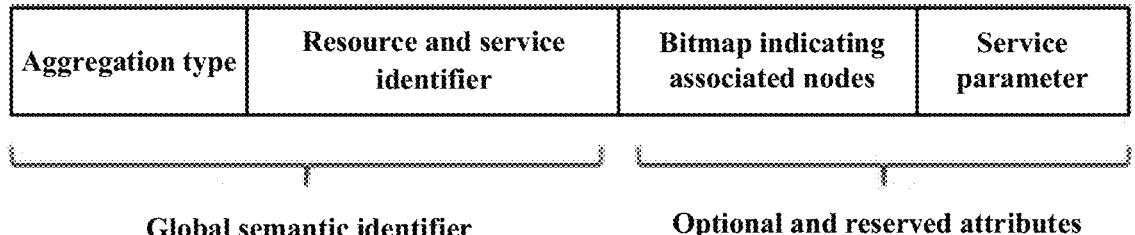
FIG. 11 is a structural diagram of an improved anycast address according to a first exemplary implementation and a second exemplary implementation of the present disclosure.

In addition to using an ordinary anycast address to identify a computing resource node group of an application, the current exemplary implementation also provides an improved anycast address structure. FIG. 11 is a structural diagram of an improved anycast address according to a first exemplary implementation and a second exemplary implementation of the present disclosure. As shown in FIG. 11, in the address structure, in addition to a global semantic part for identifying the resources and the application service type, a bitmap-based state indication for the nodes associated with the anycast address and a service parameter may further be extended and supported.

In an Anycast-based network, a computation/network converged scheduling and routing process based on stateful computing resources is independent of a specific structure of the anycast address, and the parsing and processing of the semantic of the anycast address is an internal process of a network node and is independent of an application data forwarding process. As shown in FIG. 10, a process of forwarding an end-to-end application data flow is as follows.

(I) The process for resource application, pre-deployment and state maintenance includes the following operations S1001 to S1003.

In operation S1001, an application provider applies for distributed basic computing resources from an infrastructure computing resource operation platform (such as a computation/network converged scheduling platform) according to requirements.

In operation S1002, the application provider completes service deployment on the distributed basic computing nodes obtained in S1001.

In operation S1003, the network begins to maintain the corresponding computing node resources in the state maintenance table.

(II) The application data routing and forwarding process includes the following operations S1004 to S1007.

In operation S1004, an application client initiates an application request to the network, wherein a destination address is an anycast address associated with the nodes on which the application is deployed, i.e., an available application service node list.

In operation S1005, a network ingress gateway or an edge network node executes, based on a computing resource and network resource state table, joint optimization of computation SLA and network SLA as requested by the application.

In operation S1006, the network ingress gateway or the edge network node determines an optimal application service node and an optimal network path.

In operation S1007, the network implements end-to-end routing and forwarding of application data.

Second Exemplary Implementation

Figure 12:
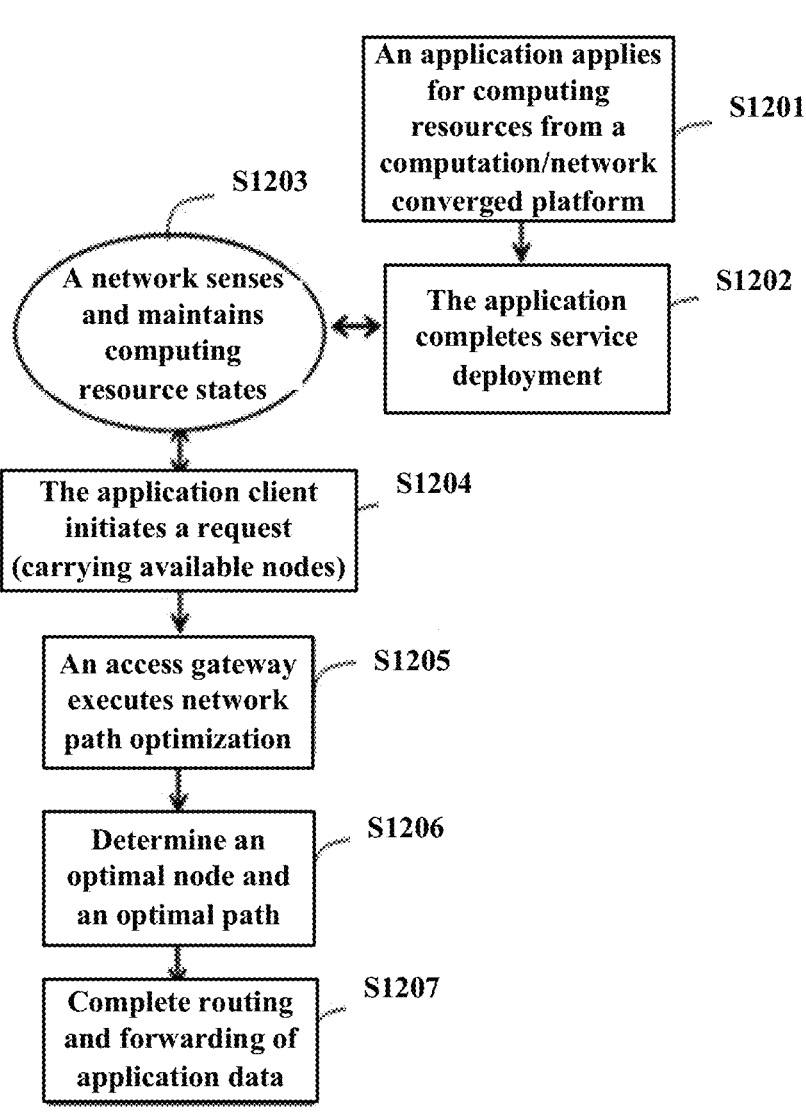
FIG. 12 is a flowchart of computation/network converged scheduling and routing based on stateless computing resources in an Anycast-based network according to a second exemplary implementation of the present disclosure.

The embodiments provide a computation/network converged scheduling and routing process based on stateless computing resources in an Anycast-based network. FIG. 12 is a flowchart of computation/network converged scheduling and routing based on stateless computing resources in an Anycast-based network according to a second exemplary implementation of the present disclosure. As shown in FIG. 12, an anycast address is adopted herein to associate and identify a computing resource node group deployed by an application, that is, when the application applies for computing resources and deploys the application on the computing resource nodes, the host address list to which these computing resource nodes belong is associated with a specific anycast address, and when an application client initiates a connection request, the anycast address is used as a destination address, and the network performs computation/network converged selection among the group of computing resource nodes associated with the anycast address.

In addition to using an ordinary anycast address to identify a computing resource node group of an application, the current exemplary implementation also provides an improved anycast address structure. FIG. 11 is a structural diagram of an improved anycast address according to a first exemplary implementation and a second exemplary implementation of the present disclosure. As shown in FIG. 11, in the address structure, in addition to a global semantic part for identifying the resources and the application service type, a bitmap-based state indication for the nodes associated with the anycast address and a service parameter may further be extended and supported.

In an Anycast-based network, a computation/network converged scheduling and routing process based on stateful computing resources is independent of a specific structure of the anycast address, and the parsing and processing of the semantic of the anycast address is an internal process of a network node and is independent of an application data forwarding process. As shown in FIG. 12, a process of forwarding an end-to-end application data flow is as follows.

(I) The process for resource application, pre-deployment and state maintenance includes the following operations S1201 to S1203.

In operation S1201, an application provider applies for distributed basic computing resources from an infrastructure computing resource operation platform (e.g. a computation/network converged scheduling platform) according to requirements.

In operation S1202, the application provider completes service deployment on the distributed basic computing nodes obtained in S1201.

In operation S1203, an application resource management/control and scheduling system begins to maintain the corresponding computing node resources in the state maintenance table.

(II) The application data routing and forwarding process includes the following operations S1204 to S1207.

In operation S1204, an application client initiates an application request to the network, wherein a destination address is an anycast address associated with the nodes on which the application is deployed; in addition, an optimal computing node or an optimal computing node list is explicitly indicated in the address structure or in parallel to the address structure. For example, in the improved anycast address structure as shown in FIG. 11, the optimal computing node(s) is/are indicated by a bitmap.

In operation S1205, a network ingress gateway or an edge network node executes, based on a network resource state table, optimization of network SLA as requested by the application.

In operation S1206, the network ingress gateway or the edge network node determines an optimal application service node and an optimal network path In operation S1207, the network implements end-to-end routing and forwarding of application data.

Obviously, those having ordinary skill in the art should understand that the respective modules or operations of the present disclosure can be implemented by a universal computing device, they may be centralized on a single computing device or distributed on a network composed of multiple computing devices, they can be implemented by program codes executable by a computing apparatus, and thus can be stored in a storage apparatus and executed by the computing apparatus.

Furthermore, in some cases, the shown or described operations may be executed in an order different from that described here, or they are made into integrated circuit modules respectively, or multiple modules or operations therein are made into a single integrated circuit module for implementation. As such, the present disclosure is not limited to any particular hardware and software combination.

The foregoing descriptions are merely exemplary embodiments of the present disclosure, but are not intended to limit the present disclosure. For those having ordinary skill in the art, the present disclosure may have various modifications and variations. Any modifications, equivalent replacements, improvements and the like made within the principle of the present disclosure shall belong to the scope of protection of the present disclosure.

What is claimed is:

1. An application data routing method, comprising following operations performed by a network edge node or a network ingress gateway:

receiving application data sent by an application client, wherein the application data carries or indicates a second cloud resource node list, the second cloud resource node list comprises one or more cloud resource nodes that are selected by an application provider from a first cloud resource node list according to a cloud resource state of each cloud resource node in the first cloud resource node list, the first cloud resource node list comprises one or more cloud resource nodes, and the second cloud resource node list is indicated in the application data in a following manner:

using an anycast address carrying a bitmap as a destination address corresponding to the application data, wherein an indication bit in the bitmap is used for indicating whether a cloud resource node, corresponding to the indication bit, in the first cloud resource node list is contained the second cloud resource node list; or, carrying an identification index associated with the second cloud resource node list in a field other than a destination address field in the application data, wherein the field other than the destination address field comprises: a dedicated forwarding packet header, or an IPV6 known extension packet header, or both the dedicated forwarding packet header and the IPV6 known extension packet header;

determining a target cloud resource node from the second cloud resource node list according to a network state between the application client and each of the one or more cloud resource nodes in the second cloud resource node list; and routing and forwarding the application data to the target cloud resource node.

2. The method according to claim 1, wherein the one or more cloud resource nodes in the second cloud resource node list are selected in the following manner: performing optimization of a cloud resource Service Level Agreement (SLA) on the one or more cloud resource nodes in the first cloud resource node list according to the cloud resource state of each of the one or more cloud resource nodes in the first cloud resource node list, and selecting one or more cloud resource nodes from the first cloud resource node list based on a result of optimization of the cloud resource SLA to form the second cloud resource node list.

3. The method according to claim 2, wherein performing optimization of a cloud resource SLA on the one or more cloud resource nodes in the first cloud resource node list according to the cloud resource state of each of the one or more cloud resource nodes in the first cloud resource node list comprises:

executing screening on the one or more cloud resource nodes in the first cloud resource node list by using the cloud resource state as a constraint.

4. The method according to claim 1, wherein determining a target cloud resource node from the second cloud resource node list according to a network state between the application client and each of the one or more cloud resource nodes in the second cloud resource node list comprises:

performing optimization of a network Service Level Agreement (SLA) on the one or more cloud resource nodes in the second cloud resource node list according to the network state between the application client and each of the one or more cloud resource nodes in the second cloud resource node list; and determining the target cloud resource node from the second cloud resource node list based on a result of optimization of the network SLA.

5. The method according to claim 4, wherein performing optimization of a network SLA on the one or more cloud resource nodes in the second cloud resource node list according to the network state between the application client and each of the one or more cloud resource nodes in the second cloud resource node list comprises one of:

in a case where the second cloud resource node list comprises one cloud resource node, executing, according to the network state between the application client and the cloud resource node in the second cloud resource node list, network connection path computation on the cloud resource node in the second cloud resource node list by using an application network demand as a constraint; or in a case where the second cloud resource node list comprises multiple cloud resource nodes, executing, according to the network state between the application client and each of the multiple cloud resource nodes in the second cloud resource node list, network connection path computation on the multiple cloud resource nodes in the second cloud resource node list by using a full-network service dynamic traffic load and an application network demand as a constraint.

6. The method according to claim 1, wherein the cloud resource state of each of the one or more cloud resource nodes in the first cloud resource node list is maintained in a converged scheduling platform and synchronized to the application client or an application server; and the network state between the application client and each of the one or more cloud resource nodes in the second cloud resource node list is maintained at the network edge node, the network ingress gateway or the converged scheduling platform.

7. The method according to claim 6, wherein in a case where the network state between the application client and each of the one or more cloud resource nodes in the second cloud resource node list is maintained in the converged scheduling platform, the method further comprises:

in response to receiving the application data sent by the application client, acquiring, from the converged scheduling platform, the network state between the application client and each of the one or more cloud resource nodes in the second cloud resource node list.

8. The method according to claim 1, wherein the cloud resource state of each of the one or more cloud resource nodes comprises at least one of: a cloud resource occupancy state of each of the one or more cloud resource nodes; and an application capacity load state of each of the one or more cloud resource nodes.

9. The method according to claim 1, wherein the network state between the application client and each of the one or more cloud resource nodes comprises at least one of: a bandwidth, a delay, a jitter, and a packet loss rate.

10. An application data routing apparatus, comprising: a memory storing instructions and a processor in communication with the memory, wherein the processor is configured to execute the instructions to perform the method according to claim 1.

11. A non-transitory computer-readable storage medium storing a computer program, wherein the computer program, when being executed by a processor, causes the processor to execute the operations of the method according to claim 1.

* * * * *